UNITED STATES PATENT OFFICE 2,658,340

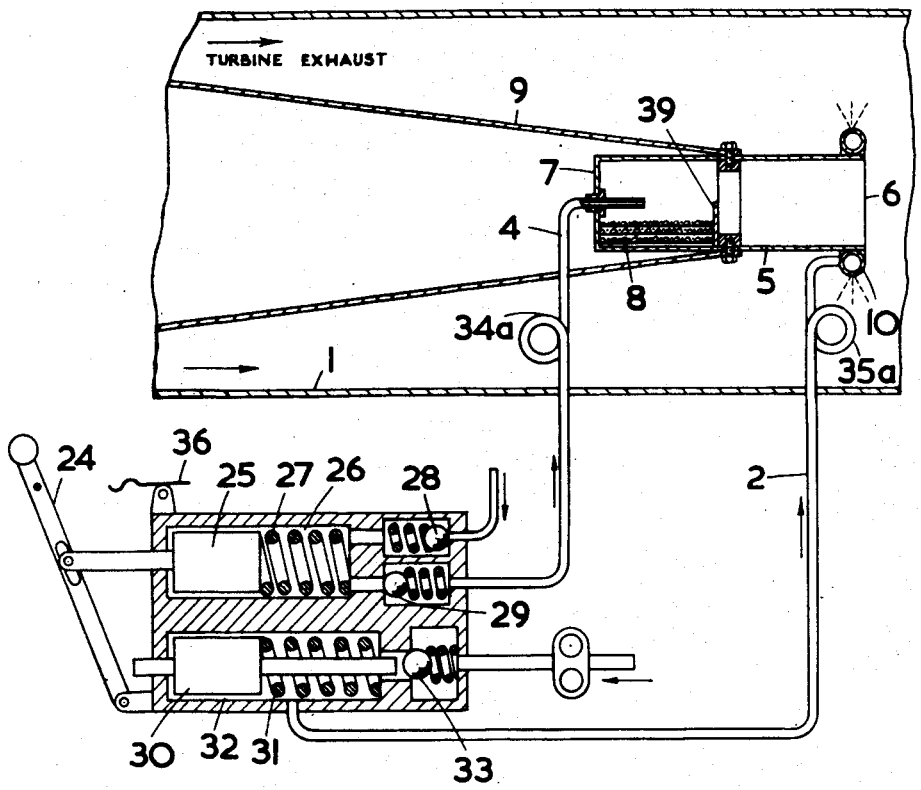

APPARATUS FOR IGNITING FUEL IN FAST-MOVING HOT GAS STREAMS

Henry Cohen, Cove, near Farnborough, England, assignor to Power Jets (Research & Development) Limited, London, England Application January 23, 1946, Serial No. 642,920

Claims priority, application Great Britain February 1, 1945

2 Claims. (Cl. 60—39.71)

This invention relates to combustion arrangements particularly for use in high velocity gas streams. As an example of an application of the invention which well illustrates one of its objects, it is applied to facilitate or promote the ignition of fuel in a reheat combustion system in the output of a gas turbine jet propulsion system. In such systems once ignition of the main fuel supply has been started it is found relatively easy to make it self-sustaining. To ignite the fuel initially, however, has hitherto required the provision of a spark plug igniter or a glow plug igniter or the like. Since such an expedient may involve the provision of some wiring and insulation in inconvenient location and exposed to high temperature, it is from some points of view undesirable.

To obviate this disadvantage, it is proposed in co-pending patent application No. 252,875, filed October 24, 1951, in the name of Daniel Norman Walker, which is a division of this application, to provide means for introducing, in addition to the normal fuel supply, an initial flow of a reagent other than the normal fuel in the form of pilot fuel which will readily ignite under the conditions prevailing in the region where ignition is to be effected.

The pilot fuel can thus be supplied by relatively simple and easily applied means which are not especially vulnerable to high temperatures and which will not require any careful maintenance.

This invention constitutes an improvement on that described in said co-pending patent application No. 252,875 and accordingly the invention provides a combustion system for igniting fuel to be burnt in a high velocity gaseous stream, comprising a duct conveying said stream, wall means defining a zone shielded from said stream, means for momentarily injecting into said zone a charge of a reagent other than the normal fuel to be burnt, said reagent being spontaneously ignitable in the ambient conditions created in the duct by the hot stream to form a pilot flame, and means for injecting normal fuel into the stream immediately subsequent to the injection of said reagent, whereby said fuel is ignited by the pilot flame.

In its application to a gas turbine jet propulsion system, the combustion system is located in the jet pipe thereof, preferably at the downstream end of the usual tapering fairing on the downstream side of the turbine.

The invention and further features thereof will be better understood by means of the following description made with reference to the accompanying drawing which is a diagrammatic view of one form of the invention.

In the drawing the exhaust gases from a gas turbine flow at high velocity in the direction shown by the arrows through the duct 1 in which is provided the usual co-axial conical fairing or bullet shaped member 9 and a reheat system comprising a fuel spray of re-heat fuel supplied through a pipe 2 protruding through the wall of the duct 1, and injected into the exhaust stream by a jet nozzle 10.

The system further comprises a cylindrical pot 5 which is open at its downstream end 6, and through the closed end 7 of which is introduced a tube 4 for the purpose of injecting pilot fuel. At the bottom of the pot 5 are arranged several layers of wire gauze 8, and the whole assembly is mounted at the end of the conical bullet shaped member 9.

The system also comprises a baffle which may conveniently be in the form of a semi-circular plate 39 disposed transverse to the pot 5. This has the effect of procuring suitable conditions of gas circulation and turbulence for the pilot fuel to ignite, and the gauze 8 not only constitutes a source of heat to promote pilot ignition but also affords a relatively large area for the pilot fuel to fall on and upon which it is adequately dispersed.

As described in U. S. A. patent application Serial No. 630,950, filed November 26, 1945, in the names of Henry Cohen and John Henry Hamilton Darth, it appears to be the fact that the interior of the pot 5 houses, so to speak, a region of turbulent air in which there is no extremely high velocity, and inward flow from the main gas stream into the pot carries with it some of the fuel which, burning in a primary zone, is able to sustain combustion of the remainder of the fuel downstream from its point of injection. The main fuel is supplied through pipe 2 and ejected through jet nozzles 10.

It is understood that in this form of embodiment pilot ignition is dependent upon this contrivance being adequately heated initially by the main gas stream in which reheating is required.

The injection of pilot fuel is timed to precede the commencement of flow of the main fuel by the arrangement shown in which lever 24 moves piston 25 in cylinder 26 against spring 27 to open non-return valve 29, and can also move rod 30 against spring 31 in cylinder 32 to open non-return valve 33. Forward movement of lever 24 introduces pilot fuel through pipe 4 until piston 25 is near the end of its stroke when rod 30 is contacted and moved to introduce normal fuel through pipe 2. Lever 24 can be held in position or released by thumb latch 36. This arrangement is the same as that shown in said copending patent application Serial No. 252,875.

A non-return valve 28 is provided, through which the pilot fuel enters cylinder 26.

The pipe 2 which crosses the main gas stream from the wall of the exhaust pipe to the pot 5 and the pipe 4 may be indirectly led as for example by providing loops 34A, 35A in order to afford some degree of elasticity to accommodate thermal expansions or minor distortions. It has been found that it is not necessary for the pilot fuel injector to be in any way elaborate; a plain pipe end projecting from the floor of the pot 5 has been shown experimentally to be adequate since the gauze 8 renders any spraying or atomisation unnecessary.

The pilot fuel may be a gas or volatile liquid and the invention also includes the use as a pilot fuel of a mixture comprising a lubricating oil containing 0.05 to 0.1 per cent of stearic acid and 5% of amyl nitrite, the mixture being variable within reasonable limits of proportion, as well as the use of colloidal magnesium and tertiary butyl peroxide. With such a fuel as pilot fuel and with kerosene as the ordinary fuel, successful pilot and subsequent ignition is found to be practicable in a high velocity gas stream at a temperature of the order of 600 degs. C.

I claim:

1. A combustion system for igniting fuel to be burnt in a fast-moving hot gas stream, comprising a duct carrying said stream, wall means within the duct defining a cylindrical chamber coaxial therewith, said chamber having its upstream end closed and its downstream end open and forming a stabilized combustion zone, a first fuel injector within said chamber, a layer of wire gauze disposed within and extending longitudinally of said chamber and below and close to said injector, means for supplying to said first injector a momentary charge of a reagent other than the normal fuel to be burnt, said reagent being spontaneously ignitable by contact with said layer of gauze to form a pilot flame in said zone, a further injector injecting into the free stream in the vicinity of the pilot flame, and means to supply fuel to said further injector immediately subsequent to the injection of said reagent, whereby said fuel is ignited by the pilot flame.

2. A combustion system for igniting fuel to be burnt in a fast-moving hot gas stream, comprising a duct carrying said stream, wall means within the duct defining a cylindrical chamber coaxial therewith, said chamber having its upstream end closed and its downstream end open and forming a stabilized combustion zone, a first fuel injector within said chamber, a semi-circular baffle disposed within said chamber between the first injector and the open end of the chamber and transverse to the axis thereof, means for supplying to said first injector a momentary charge of a reagent other than the normal fuel to be burnt, said reagent being spontaneously ignitable in the conditions created in the chamber by the hot gas stream to form a pilot flame in said zone, a further injector injecting into the free stream in the vicinity of the pilot flame, and means to supply fuel to said further injector immediately subsequent to the injection of said reagent, whereby said fuel is ignited by the pilot flame.

HENRY COHEN.

References Cited in the file of this patent

UNITED STATES PATENTS

| Number | Name | Date |
|---|---|---|
| 858,640 | Wells | July 2, 1907 |
| 1,273,466 | Doble | July 23, 1918 |
| 1,656,486 | Huntington et al. | Jan. 17, 1928 |
| 1,849,051 | Helmore | Mar. 8, 1932 |
| 1,854,615 | Lasley | Apr. 19, 1932 |
| 1,879,186 | Goddard | Sept. 27, 1932 |
| 2,093,008 | Egerton | Sept. 14, 1937 |
| 2,158,050 | Bereslavsky | May 16, 1939 |
| 2,279,546 | Ziegler | Apr. 14, 1942 |
| 2,382,564 | Haverstick | Aug. 14, 1945 |
| 2,385,833 | Nahigyan | Oct. 2, 1945 |
| 2,404,335 | Whittle | July 16, 1946 |
| 2,407,973 | Beckstrom | Sept. 24, 1946 |
| 2,410,881 | Hunter | Nov. 12, 1946 |
| 2,422,214 | Meyer et al. | June 17, 1947 |
| 2,474,685 | McCollum | June 28, 1949 |
| 2,500,334 | Zucrow | Mar. 14, 1950 |
| 2,520,388 | Earl | Aug. 29, 1950 |

FOREIGN PATENTS

| Number | Country | Date |
|---|---|---|
| 279,770 | Great Britain | Nov. 3, 1927 |
| 558,934 | France | June 5, 1923 |